United States Patent Office 2,728,776
Patented Dec. 27, 1955

2,728,776

QUATERNARY AMMONIUM COMPOUNDS

Martin Schenck, Berlin-Frohnau, Germany, assignor to Schering A. G., Berlin, Germany, a corporation of Germany No Drawing. Application July 22, 1953,
Serial No. 369,729

8 Claims. (Cl. 260—309.2)

The present invention relates to benzimidazol compounds, and more particularly to benzimidazol compounds which have in 2-position an aliphatic side chain wherein one hydrogen atom is substituted by a quaternizated tertiary amino group, and to a method of making same.

It is one object of this invention to provide new benzimidazol compounds which are useful as antihistaminic drugs.

Another object of this invention is to provide simple and effective processes of producing such new benzimidazol compounds which have a high antihistaminic activity.

Other objects and advantageous features of this invention will become apparent as the description proceeds.

The new benzimidazol derivatives according to the present invention are quaternary ammonium compounds of benzimidazol compounds of the following formula

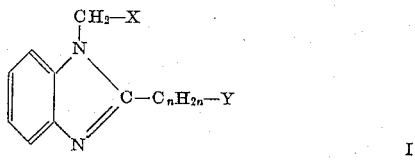

I

In this formula X represents a phenyl residue or a heterocyclic residue of the thiophene or furan type linked to the CH₂-group by a carbon atom whereby the phenyl residue or the heterocyclic residue may be substituted by halogen, a lower alkyl residue, or a lower alkoxy group, while Y is a dimethylamino group and $n$ indicates the integers 1 or 2.

The new quaternary ammonium compounds may be produced by converting said tertiary benzimidazol bases of the above given Formula I, by means of methylating quaternizing agents, into their quaternary ammonium compounds whereby the nitrogen atom is transformed from its three-valent state into the five-valent state. This conversion of said bases considerably increases their antihistaminic activity. Thus, for instance, the reaction product obtained according to the present invention by quaternization of 1-(p-chlorobenzyl)-2-dimethyl amino methyl benzimidazol by means of methyl chloride or methyl bromide is a very effective antihistaminic agent.

The new quaternary ammonium compounds may be produced in various ways. One may, for instance, cause imidazol derivatives of the above given Formula I, which are obtainable according to methods described in copending patent application Serial No. 211,198 of Martin Schenck and Wilhelm Heinz, filed February 15, 1951, now Patent No. 2,689,853, to react with conventional quaternization agents, such as methyl halogenides, dimethyl sulfate, aryl sulfonic acid methyl esters and the like.

"Quaternization" according to the present invention shall also comprise the reaction of chlorohydrates of the above mentioned imidazol derivatives with methanol.

Another method of preparing said quaternary ammonium compounds comprises the reaction of halogen containing intermediate compounds of the following Formula II directly with trimethylamine according to the following equation instead of with secondary amines.

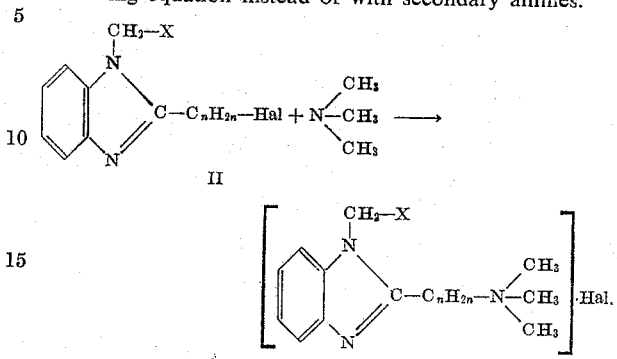

This last mentioned process may be modified inasmuch as the substituent CH₂—X may be subsequently introduced into the molecule whereby the corresponding intermediate product, after quaternization, is reacted, for instance, with benzyl halogenide or any other halogenide capable of introducing a CH₂—X group into the molecule.

The methods of preparing the new quaternary ammonium compounds of benzimidazol derivatives are, of course, given herein only as examples of ways and means of producing said compounds without limiting this invention to such methods. In principle, the new compounds may be produced either from corresponding imidazol compounds by reaction with quaternizing means or by first producing quaternary ammonium compounds of suitable intermediate products and then converting said quaternary ammonium intermediate compounds into the desired new compounds.

Quaternization is effected at room temperature or at elevated temperature, preferably while shaking in a sealed heavy-walled glass tube or in an autoclave. As stated above, alkyl halogenides, such as methyl chloride or methyl bromide, alkyl sulfates, such as dimethyl sulfate, p-toluene sulfonic acid methyl ester and the like may be used as such quaternization agents.

The reaction mixture may be diluted by the addition of suitable diluting agents, such as ether, acetone, benzene, alcohol, nitromethane and others.

The quaternary ammonium compounds according to the present invention are white, crystalline substances which are more or less soluble in water or alcohol. Some of them crystallize together with water of crystallization.

Of special importance are those benzimidazol compounds according to the present invention which have in 1-position a benzyl residue substituted in p-position. The anion of the quaternary ammonium compound, however, is of minor importance.

The following starting materials are, for instance, especially suitable for the production of methylated quaternary ammonium compounds according to this invention:

1-benzyl-2-dimethylamino methyl benzimidazol,
1-benzyl-2-(1'-dimethylamino ethyl) benzimidazol,
1-benzyl-2-(2'-dimethylamino ethyl) benzimidazol, and the corresponding
1-(p-chlorobenzyl), 1-(p-bromo benzyl), 1-(p-fluoro benzyl),
1-(p-methyl benzyl), 1-(p-methoxy benzyl), 1-(thienyl-2'methyl),
1-(chloro thienyl-2'-methyl) derivatives of said benzimidazol compounds.

The following examples serve to illustrate this invention without, however, limiting the same thereto.

EXAMPLE 1

*1-benzyl-2-dimethylamino methyl benzimidazol chloromethylate*

26 g. of 1-benzyl-2-chloro methyl benzimidazol obtained according to Example 1 of copending application Serial No. 211,198, filed February 15, 1951, Patent No. 2,689,853, are shaken at room temperature in a sealed heavy-walled glass tube for 3 hours with 200 cc. of ether and 15 cc. of trimethylamine. The mixture is allowed to stand overnight and the precipitated needles are filtered off by suction. They are washed with ether. Yield: 27 g. On dissolving said product in a small amount of alcohol and precipitating with ether, a product is obtained which melts at 209° C. (with decomposition). The new compound is readily soluble in water and alcohol and contains ½ mol of water of crystallization.

EXAMPLE 2

*1-(p-chloro benzyl)-2-dimethylamino methyl benzimidazol chloromethylate*

To 9.0 g. of 1-(p-chloro benzyl)-2-dimethylamino methyl benzimidazol obtained according to Example 1 of copending application Serial No. 211,198, filed February 15, 1951, by using p-chloro benzylamine in the place of benzylamine as starting material, there are added 100 cc. of ether and an excess of methylchloride. The mixture is shaken in a sealed heavy-walled tube overnight, and is worked up after three days. White needles melting at 215–217° C. (with decomposition) are obtained containing 2 mols of water of crystallization. The compound is readily soluble in water and alcohol.

The same compound is obtained by reacting 1-(p-chloro benzyl)-2-chloro methyl benzimidazol with trimethylamine in an analogous manner as described in Example 1.

In the place of 1-benzyl-2-chloro methyl benzimidazol, used as starting material in Example 1, there may be used equimolecular amounts of:

1-(p-bromo benzyl)-2-bromo methyl benzimidazol
1-(p-fluoro benzyl)-2-chloro methyl benzimidazol
1-(p-methyl benzyl)-2-chloro methyl benzimidazol
1-(p-ethyl benzyl)-2-chloro methyl benzimidazol
1-(p-methoxy benzyl)-2-chloro methyl benzimidazol
1-(p-ethoxy benzyl)-2-chloro methyl benzimidazol
1-(thienyl-2'-methyl)-2-chloro methyl benzimidazol
1-(5'-chloro thienyl-2'-methyl)-2-chloro methyl benzimidazol
1-(5'-methyl thienyl-2'-methyl)-2-chloro methyl benzimidazol
1-(5'-methoxy thienyl-2'-methyl)-2-chloro methyl benzimidazol
1-(furyl-2'-methyl)-2-chloro methyl benzimidazol
1-(5'-chloro furyl-2'-methyl)-2-chloro methyl benzimidazol
1-(5'-methyl furyl-2'-methyl)-2-chloro methyl benzimidazol
1-(5'-methoxy furyl-2'-methyl)-2-chloro methyl benzimidazol
1-benzyl-2-(2'-chloro ethyl) benzimidazol
1-benzyl-2-(1'-chloro ethyl) benzimidazol
1-(p-chloro benzyl)-2-(2'-chloro ethyl) benzimidazol
1-(p-chloro benzyl)-2-(1'-chloro ethyl) benzimidazol
1-(p-bromo benzyl)-2-(1'-bromo ethyl) benzimidazol
1-(p-methyl benzyl)-2-(1'-chloro ethyl) benzimidazol
1-(p-ethyl benzyl)-2-(1'-chloro ethyl) benzimidazol
1-(p-methoxy benzyl)-2-(1'-chloro ethyl) benzimidazol
1-(thienyl-2'-methyl)-2-(1'-chloro ethyl) benzimidazol
1-(5'-chloro thienyl-2'-methyl)-2-(1'-chloro ethyl) benzimidazol
1-(furyl-2'-methyl)-2-(1'-chloro ethyl) benzimidazol
1-(5'-chloro furyl-2'-methyl)-2-(1'-chloro ethyl) benzimidazol Likewise, in the place of 1-(p-chloro benzyl)-2-dimethylamino methyl benzimidazol, used as starting material in Example 2, there may be employed equimolecular amounts of:

1-benzyl-2-dimethylamino methyl benzimidazole
1-(p-bromo benzyl)-2-dimethylamino methyl benzimidazol
1-(p-fluorbenzyl)-2-dimethylamino methyl benzimidazol
1-(p-methyl benzyl)-2-dimethylamino methyl benzimidazol
1-(p-ethyl benzyl)-2-dimethylamino methyl benzimidazol
1-(p-methoxy benzyl)-2-dimethylamino methyl benzimidazol
1-(p-ethoxy benzyl)-2-dimethylamino methyl benzimidazol
1-(thienyl-2'-methyl)-2-dimethylamino methyl benzimidazol
1-(5'-chloro thienyl-2'-methyl)-2-dimethylamino methyl benzimidazol
1-(5'-methyl thienyl-2'-methyl)-2-dimethylamino methyl benzimidazol
1-(5'-methoxy thienyl-2'-methyl)-2-dimethylamino methyl benzimidazol
1-(furyl-2'-methyl)-2-dimethylamino methyl benzimidazol
1-(5'-chloro furyl-2'-methyl)-2-dimethylamino methyl benzimidazol
1-(5'-methyl furyl-2'-methyl)-2-dimethylamino methyl benzimidazol
1-(5'-methoxy furyl-2'-methyl)-2-dimethylamino methyl benzimidazol
1-benzyl-2-(2'-dimethylamino ethyl) benzimidazol
1-benzyl-2-(1'-dimethylamino ethyl) benzimidazol
1-(p-chloro benzyl-2-(2'-dimethylamino ethyl) benzimidazol
1-(p-chloro benzyl)-2-(1'-dimethylamino ethyl) benzimidazol
1-(p-bromo benzyl)-2-(1'-dimethylamino ethyl) benzimidazol
1-(p-methyl benzyl)-2-(1'-dimethylamino ethyl) benzimidazol
1-(p-ethyl benzyl)-2-(1'-dimethylamino ethyl) benzimidazol
1-(p-methoxy benzyl)-2-(1'-dimethylamino ethyl) benzimidazol
1-(thienyl-2'-methyl)-2-(1'-dimethylamino ethyl) benzimidazol
1-(5' - chloro thienyl - 2' - methyl) - 2 - (1' - dimethylamino ethyl) benzimidazol
1-(furyl-2'-methyl)-2-(1'-dimethylamino ethyl) benzimidazol
1-(5'-chloro furyl-2'-methyl)-2-(1'-dimethylamino ethyl) benzimidazol
1-(furyl-4'-methyl)-2-dimethylamino methyl benzimidazol
1-(5'-chloro furyl-2'-methyl)-2-(2'-dimethylamino ethyl) benzimidazol
1-(5' - bromo thienyl - 2' - methyl) - 2 - (1' - dimethylamino ethyl) benzimidazol Of course, other changes and variations in the reaction conditions, reaction temperature and duration, in the methods of working up and purifying the resulting quaternary ammonium compounds and the like may be made by those skilled in the art in accordance with the principles set forth herein and in the claims annexed hereto.

The new antihistaminic drugs are preferably administered orally either in the form of tablets, pills, lozenges, and other solid form, or in the form of their solutions in water, isotonic sodium chloride solution, sirup, dilute alcohol, or the like. They may also be topically applied, for instance, in the form of ointments, creams, and the like. They may be administered in the form of aerosols. Injectable solutions thereof may also be prepared. The average adult dose is between about 5 mg. and 10 mg. three to four times daily, which dose may be reduced to between 5 mg. and 10 mg. twice daily, if adequate response is obtained.

Thus when using the new quaternary ammonium compounds in the place of old antihistaminic drugs and also of the starting bases as described in application Serial No. 211,198 (Patent No. 2,689,853) the advantage will be frequently a considerable reduction of the dose needed.

When introducing the CH₂-X group into the intermediate quaternary ammonium compound, there may be used in the place of benzyl halogenide, any other suitable halogenide, such as p-halogeno benzyl halogenide, p-alkoxy benzyl halogenide, p-alkyl benzyl halogenide and the halogenides of thienyl methyl, halogeno thienyl methyl, alkoxy thienyl methyl, furyl methyl, halogeno furyl methyl, alkoxy furyl methyl and alkyl furyl methyl.

To obtain new quaternary benzimidazol compounds wherein the non-toxic anion is another than mentioned there is also possible to convert one into another, for instance the chloromethylates into the corresponding phosphoric acid compounds, by using methods known in the art, e. g. according to the process described in the German patent application M 11,099, 12q, 1/01, published November 13, 1952.

I claim:

1. A benzimidazole compound of the following formula

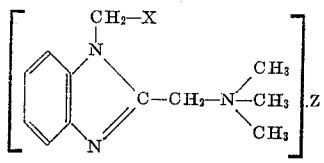

wherein X is a member selected from the group consisting of phenyl, halogenated phenyl, lower alkyl substituted phenyl, and lower alkoxy substituted phenyl, and Z is a non-toxic anion selected from the group consisting of a halogen anion having a molecular weight of at least that of chlorine, the sulfate anion, the methyl sulfate anion, and the phosphate anion.

2. A benzimidazole compound of the following formula

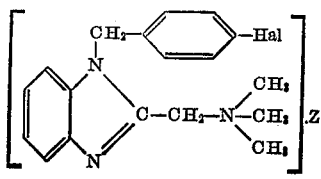

wherein Hal is halogen and Z is a halogen anion having a molecular weight of at least that of chlorine.

3. A benzimidazol compound of the following formula

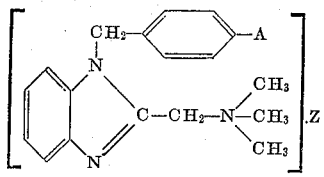

wherein A is a lower alkyl radical and Z is a halogen anion having a molecular weight of at least that of chlorine.

4. A benzimidazol compound of the following formula

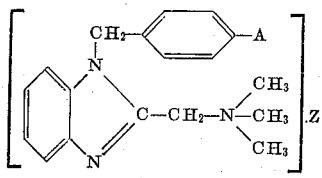

wherein A is a lower alkoxy group and Z is a halogen anion having a molecular weight of at least that of chlorine.

5. A 1-benzyl-2-dimethylamino methyl benzimidazole halogeno methylate, the halogen present therein having a molecular weight of at least that of chlorine.

6. 1-benzyl-2-dimethylamino methyl benzimidazole chloromethylate.

7. 1-(p-chloro benzyl)-2-dimethylamino methyl benzimidazole chloromethylate.

8. 1-(p-chloro benzyl)-2-dimethylamino methyl benzimidazole bromomethylate.

References Cited in the file of this patent
UNITED STATES PATENTS 2,689,853    Schenck et al. _____ Sept. 23, 1954

OTHER REFERENCES

Idson: Chem. Reviews, vol. 47, pp. 493, 499 (1950).